UNITED STATES PATENT OFFICE.

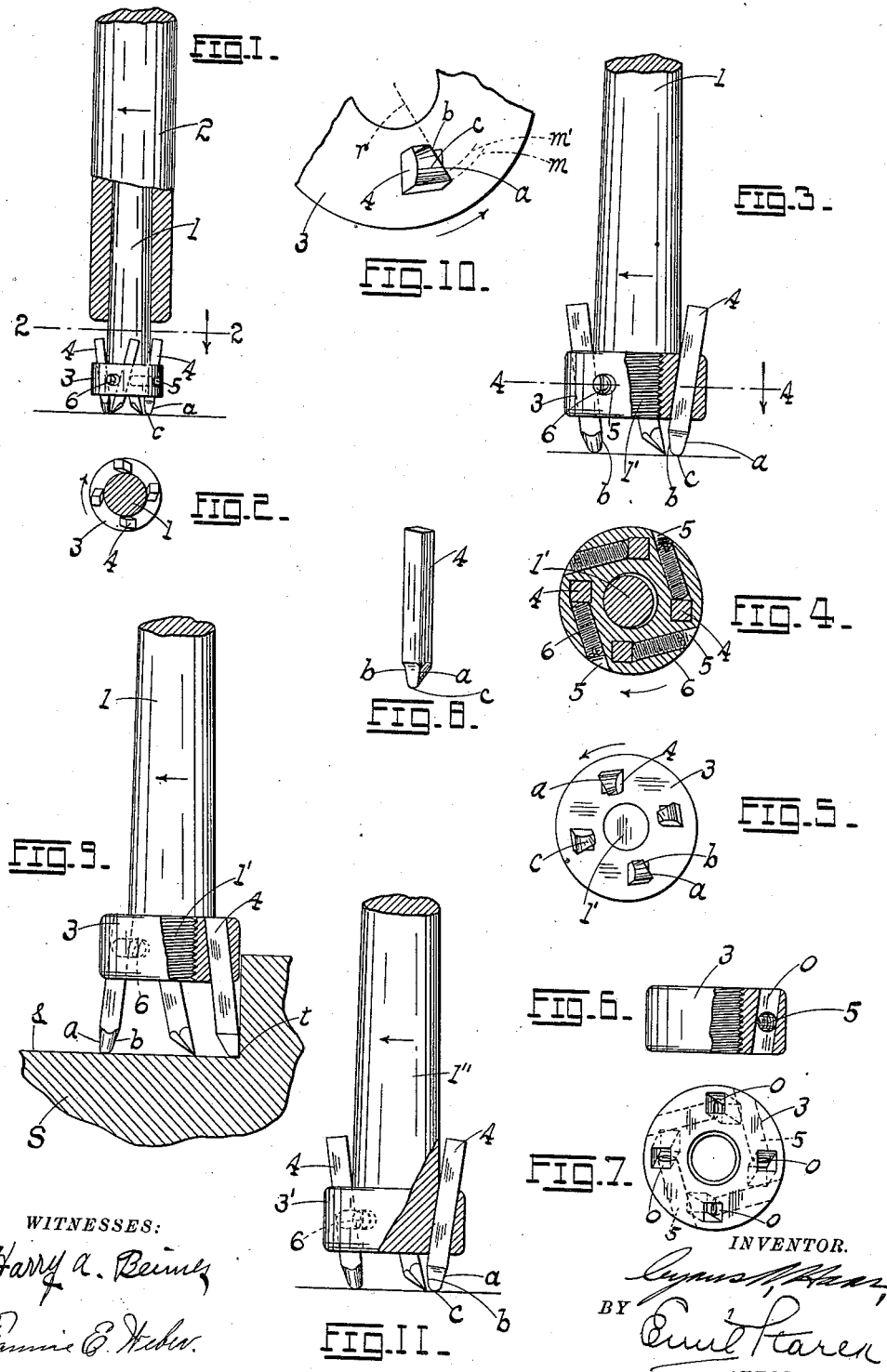

CYRUS A. HAAS, OF ST. LOUIS, MISSOURI.

CUTTER-HEAD.

1,043,225.  Specification of Letters Patent.  Patented Nov. 5, 1912.

Application filed October 23, 1911. Serial No. 656,187.

*To all whom it may concern:*

Be it known that I, CYRUS A. HAAS, a citizen of the United States, residing at St. Louis, State of Missouri, have invented certain new and useful Improvements in Cutter-Heads, of which the following is a full, clear, and exact description, reference being had to the accompanying drawings, forming a part hereof.

My invention has relation to improvements in cutter-heads; and consists in the novel construction of cutter more fully set forth in the specification and pointed out in the claim.

In the drawings, Figure 1 is a side elevation of one form of my improved cutter (or cutter-head) attached to the holder of a milling machine; Fig. 2 is a horizontal cross-section on the line 2—2 of Fig. 1; Fig. 3 is an enlarged side elevation on the order shown in Fig. 1, with parts broken away; Fig. 4 is a cross-section through the head on the line 4—4 of Fig. 3; Fig. 5 is a face or end view of the cutter-head; Fig. 6 is a side view of the head detached, parts being broken away; Fig. 7 is a face view of the head with cutters removed; Fig. 8 is a perspective of one of the cutters; Fig. 9 is a side elevation of the tool with the head and its cutters reversed; Fig. 10 is an enlarged view of a portion of the end view shown in Fig. 5, showing the clearance between the circle described by the cutting edge of the cutter and the rear edge of the contiguous face of the cutter-stock; and Fig. 11 is a side elevation of a modified form of tool showing the shank and head integral or in one piece.

The object of my invention is to provide a rotatable cutter-head having a series of independent cutters disposed at equal distances from the axis of rotation of said head, each cutter being provided with opposing cutting edges whereby it makes it possible to start and finish a piece of work at any point on its surface away from the edge of said surface.

A further object is to provide a cutter-head in which the cutters may be readily adjusted by simply dropping them down on a finished surface while in the head after which they may be rigidly secured to the head; one in which the cutters may be sharpened by even an unskilled mechanic; one which for a certain position of the cutter-head will allow the cutters to reach into corners; one in which the head and its cutters may be reversed; one in which there is no interruption in the cutting operation since the tool has no idle stroke; one which is capable of utilizing a multiple or series of independent cutters at one time; and one having further and other advantages resulting primarily in great durability and low maintenance for the tool, a very decided advantage over those now in general use, all as will be fully apparent from a detailed description of the invention which is as follows:—

Referring to the drawings, and for the present to Figs. 1 to 8 inclusive, 1 represents the shank of the cutter the same being secured to the holder 2 of any conventional milling machine (not shown) by which rotation may be imparted to the shank. The lower end of the latter terminates in a reduced screw-stem 1' to which is screwed the ring or head 3, said head projecting a suitable distance beyond the walls of the shank. Formed in the head 3 and piercing the opposite faces thereof, and disposed about the axis of the head are a series of diagonally inclined openings $o$ for the insertion and reception of the stocks or body portions 4 of the cutters, the outer ends of the cutters being provided with cutting edges defined by the curve $a$, $b$, $c$, the portion $c$ operating at right angles to the surface $s$ of the stock S to be finished, and the opposing portions $a$, $b$, operating or cutting parallel thereto, as quite obvious if we assume the tool to be rotating and at the same time pressed against, and passed back and forth along said surface. Formed in the head 3 between the opposite faces thereof, and disposed in a plane across the axis of the shank 1, are a series of screw-threaded openings or sockets 5 intersecting the openings $o$, said sockets receiving screws 6 by which the cutters 4 are held in position when once adjusted. The adjustment is made by passing the screws through the head 3, then dropping the cutting edges onto a finished surface, such as $s$, so as to set the cutting portions $c$ the proper distance from the outer face of the head, then driving home the screws as clearly apparent from the drawings. The cutters when once set will have their axes inclined not only toward the axis of the shank, but to a plane radial from said axis, so that the resulting inclination is a diagonal one (Figs. 3, 6, 7). The cutter is further set so that the circle $m$ described by the portion $a$ shall be exterior to the circle $m'$ described by the rear end of the face of the stock contiguous to said cutting edge, thus allowing the rear edge of the stock-piece 4 to clear the circle $m$, a position which must necessarily be given the stock-piece to make a true cutting edge of the edge $a$, $b$, $c$. This feature is brought out to best advantage in the detailed view in Fig. 10. The head 3 being screwed to the shank 1 is of course removable, and obviously reversible.

In the figures referred to, the several cutters converge outwardly toward the axis of the tool. It is apparent therefore that by reversing the head and inserting the cutter stocks 4 so as to cause the cutting ends to project outwardly, the stock-pieces or cutters 4 will diverge outwardly or away from the axis of the tool. This is shown in Fig. 9 where the head 3 has been reversed and secured to the shank 1. By pushing the cutters far enough through their openings $o$, the cutting edges (or rather the outer portions $a$ thereof) may be brought to a position radially beyond the periphery of the head 3, thus enabling the cutter to reach corners such as $t$ on the stock S operated on. This is one of the advantages of making the head reversible.

In the forms thus far described, the head 3 is detachable from the shank 1, but the same may be made an integral part thereof. In Fig. 11 I show a shank $1''$ provided with a head $3'$ integral therewith, in which case of course, such head is not reversible. To secure the advantage of a reversed head where the latter is integral with the shank, a second tool would be necessary in which the head was provided with outwardly diverging openings for the cutters. The cutters in Fig. 11 are identical with those of the other figures and are identified by the same reference numerals.

In operation, the tool is passed over the stock S and kept rotating as quite obvious without further description. The tool rotating as it does constantly while cutting, and having no idle stroke, it is obvious that its efficiency is raised to a maximum. The individual cutters are readily sharpened and quickly adjusted, and the tool has a long life as any cutter may be quickly repaired or replaced. While the cutting edge $a$, $b$, $c$, is shown (Fig. 10) disposed in a plane lying on the radial line $r$, this disposition need not be adhered to in practice. The fact however, that of the two opposed cutting edges $a$, $b$, one of them ($b$) is on the side of, or faces the axis of the tool, permits the starting of a piece of work anywhere within a given surface ($s$) after which the tool may be advanced along said surface in any direction. With a single cutting edge ($a$), the operator could start the cut only from the edge of the surface operated on.

Having described my invention, what I claim is:—

A cutter comprising a shank, a head carried thereby and projecting beyond the walls of the shank a series of cutters having their stock passed through the head in a general direction lengthwise of the shank, the cutting ends of the cutters projecting beyond the outer face of the head, and screws passed in planes between the faces of the head and across the axis of the shank and disposed with their axes substantially parallel to the tangents to the peripheral surface of the head for holding the cutters in the head.

In testimony whereof I affix my signature, in presence of two witnesses.

CYRUS A. HAAS.

Witnesses:
EMIL STAREK,
FANNIE E. WEBER.

Copies of this patent may be obtained for five cents each, by addressing the "Commissioner of Patents, Washington, D. C."